(12) United States Patent
De Jong et al.

(10) Patent No.: US 9,994,694 B2
(45) Date of Patent: Jun. 12, 2018

(54) OLEFINICALLY UNSATURATED RADIAL STYRENIC BLOCK COPOLYMER AND AN IMPROVED VULCANIZER-FREE LATEX COMPRISING WATER AND SAID RADIAL STYRENIC BLOCK COPOLYMER

(71) Applicant: KRATON POLYMERS U.S. LLC, Houston, TX (US)

(72) Inventors: Wouter De Jong, Almere (NL); Maarten Tromp, Purmerend (NL)

(73) Assignee: Kraton Polymers U.S. LLC, Houston, TX (US)

( * ) Notice: Subject to any disclaimer, the term of this patent is extended or adjusted under 35 U.S.C. 154(b) by 0 days. days.

(21) Appl. No.: 14/510,202

(22) Filed: Oct. 9, 2014

(65) Prior Publication Data
US 2015/0104663 A1 Apr. 16, 2015

(51) Int. Cl.
*C08F 297/00* (2006.01)
*C08F 297/04* (2006.01)
*C08K 5/37* (2006.01)
*C08K 5/38* (2006.01)
*C08K 5/49* (2006.01)
*C08K 5/375* (2006.01)
*C08K 5/372* (2006.01)
*C08K 5/524* (2006.01)
*C08K 5/13* (2006.01)
*C08K 5/378* (2006.01)
*A41D 19/015* (2006.01)

(52) U.S. Cl.
CPC .......... *C08K 5/375* (2013.01); *C08F 297/046* (2013.01); *C08K 5/13* (2013.01); *C08K 5/37* (2013.01); *C08K 5/372* (2013.01); *C08K 5/378* (2013.01); *C08K 5/524* (2013.01); *A41D 19/01505* (2013.01); *Y10T 428/31938* (2015.04)

(58) Field of Classification Search
CPC .......... C08K 5/13; C08K 5/372; C08K 5/375; C08K 5/524; C08F 236/10; C08F 297/023; C09D 109/10
See application file for complete search history.

(56) References Cited

U.S. PATENT DOCUMENTS

| | | | |
|---|---|---|---|
| 3,078,254 A | 2/1963 | Zellinski et al. | |
| 3,135,716 A | 6/1964 | Uraneck et al. | |
| 3,468,972 A | 9/1969 | Hsieh | |
| 3,594,452 A | 7/1971 | De La Mare et al. | |
| 3,595,941 A | 7/1971 | Farrar et al. | |
| 3,629,372 A * | 12/1971 | Drake | 524/128 |
| 5,500,469 A | 3/1996 | Johnsen et al. | |
| 5,552,493 A | 9/1996 | Spence | |
| 5,563,204 A | 10/1996 | Speth et al. | |
| 5,578,674 A | 11/1996 | Speth et al. | |
| 7,009,000 B2 | 3/2006 | Bening et al. | |
| 7,307,124 B2 | 12/2007 | Dubois | |
| 7,589,152 B2 | 9/2009 | Dubois | |
| 2004/0044133 A1 | 3/2004 | Ko et al. | |
| 2004/0054090 A1 | 3/2004 | Bening et al. | |
| 2005/0020773 A1 | 1/2005 | Lechat et al. | |
| 2005/0130522 A1 | 6/2005 | Yang et al. | |
| 2005/0137312 A1 | 6/2005 | Dubois | |
| 2005/0215724 A1 | 9/2005 | St. Clair | |
| 2009/0306256 A1 * | 12/2009 | Mader et al. | 524/91 |
| 2010/0204397 A1 | 8/2010 | Kobayashi et al. | |

FOREIGN PATENT DOCUMENTS

| | | |
|---|---|---|
| EP | 0730617 B1 | 7/2001 |
| WO | WO-9514727 A1 * | 6/1995 |
| WO | 9615189 A2 | 5/1996 |
| WO | 96/39462 A2 | 12/1996 |
| WO | 2003010232 A1 | 2/2003 |
| WO | 2005066270 A1 | 7/2005 |
| WO | 2009032502 A1 | 3/2009 |
| WO | 2013025440 A1 | 2/2013 |

OTHER PUBLICATIONS

PCT/US2014/059834 International Search Report dated Dec. 24, 2014.
Search Report Written Opinion for NL App. No. 20112916 dated Mar. 4, 2015.
Search Report for NL App. No. 2011591 dated Jun. 3, 2014.

* cited by examiner

*Primary Examiner* — Irina S Zemel
*Assistant Examiner* — Jeffrey S Lenihan
(74) *Attorney, Agent, or Firm* — Jessica Zimberlin Eastman; Cantor Colburn LLP (57) ABSTRACT

The invention concerns an olefinically unsaturated radial styrenic block copolymer having the general formula

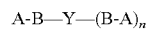

wherein each A is independently a polymer block composed of at least 90 mol. % of an alkenyl aromatic hydrocarbon, each B is independently a polymer block composed of at least 90 mol. % of one or more conjugated dienes, Y is the remnant of a coupling agent, and n is an integer from 2 to 5. The invention is also an improved vulcanizer-free latex comprising water and the olefinically unsaturated radial styrenic block copolymer. Moreover, the invention concerns a process for preparing articles by coagulation dipping from the improved latex and dipped goods made from such latex.

17 Claims, 2 Drawing Sheets

Figure 1: Ballooning

Figure 2: No ballooning

OLEFINICALLY UNSATURATED RADIAL STYRENIC BLOCK COPOLYMER AND AN IMPROVED VULCANIZER-FREE LATEX COMPRISING WATER AND SAID RADIAL STYRENIC BLOCK COPOLYMER

TECHNICAL FIELD

The current invention concerns an olefinically unsaturated radial styrenic block copolymer and an improved vulcanizer-free latex comprising water, and the olefinically unsaturated radial styrenic block copolymer dispersed therein. Moreover, it concerns a process for preparing articles by coagulation dipping from the improved latex. It also concerns the dipped goods so produced.

BACKGROUND ART

The majority of commercial surgical gloves are still manufactured from natural rubber latex (NRL). However, NRL can lead to Type I allergic reactions, including risk of anaphylactic shock. In the race to reduce patient and medical staff allergy risks, a growing number of hospitals aim to eliminate products made from NRL, including surgical gloves. Drawbacks of NRL, including odor, and adverse allergic (Type I) reactions, led to the development of synthetic alternatives. However, replacement of NRL surgical gloves by synthetic alternatives has caused in the past some concerns regarding comfort and protection.

Needed today are surgical gloves with excellent properties in the following areas: tensile strength, modulus, and puncture resistance. The new surgical gloves should offer mechanical properties and protection that is at least comparable to NRL gloves. Moreover, the surgical gloves should preferably be superior to NRL gloves in terms of comfort (which is a balance of strength and modulus).

Similar demands are made with respect to other dip-moulded articles, also referred to as dipped goods, such as condoms.

Vulcanization is a chemical process for converting rubber or related polymers into more durable materials via the addition of a curing system such as sulphur or equivalent vulcanizers in combination with additives that modify the kinetics of the vulcanizer, known as accelerators. From WO 2013/025440 articles with enhanced tensile strength and comfort are known, that are prepared from a latex comprising water, a styrenic block copolymer and a vulcanizer, by a process which comprises coating a surface with the latex to obtain a film and vulcanizing the same. The styrenic block copolymer has 2 or more poly(vinyl aromatic) blocks and at least one block of polymerized conjugated diene, wherein the styrenic block copolymer has a weight average molecular weight of 150,000 to 250,000, the poly(vinyl aromatic) blocks have a weight average molecular weight ranging from 9,000 to 15,000, and the content of poly(vinyl aromatic) blocks in the styrenic block copolymer ranges from 8 to 15% wt., based on the total styrenic block copolymer. The preferred styrenic block copolymer that is used in the experiments is a linear styrenic block copolymer.

This reference also provides a latex comprising such a styrenic block copolymer and a vulcanizer, as well as a styrenic block copolymer that is particularly suitable for use in such a latex. Excellent mechanical properties are achieved with this latex/vulcanizer system. Moreover, the gloves prepared from the artificial latex excel in comfort. On the other hand, there is an increasing demand for dipped goods that are free of products used as vulcanizers and accelerators. Vulcanizers and accelerators on the one hand provide strength, but on the other hand may act as allergens, causing sensibilisation.

WO 2013025440 teaches to use a vulcanizer. The latex may in theory be used without vulcanizer. However, those that have tried to use the latex of WO 2013025440 without vulcanizer found out that the strength is then insufficient unless this system is annealed at a temperature of between 100-130° C., preferably about 120° C. Annealing at a higher temperature causes damage to the film. Moreover, they found that the latex used without vulcanizer when annealed at the appropriate annealing temperature suffers from a phenomenon referred to as "ballooning". Ballooning is a permanent deformation of the film. There is no solution provided in the prior art with respect of this problem.

In U.S. Pat. No. 5,500,469 an artificial latex comprising a stable aqueous colloidal dispersion of a preformed multi-block copolymer prepared using a sulfate of an ethoxylated phenol as a dispersing and stabilizing agent is described. This composition is particularly suitable for preparing articles such as gloves or condoms that are free of vulcanizers. The multiblock copolymer has the formula:

$$A\text{-}B\text{—}Y_m\text{—}(B\text{-}A)_n$$

wherein each A is independently a polymer block of an alkenyl aromatic hydrocarbon, the total A being at least 5 weight percent of the total weight of the polymer; wherein Y is the remnant of a multifunctional coupling agent; m is 0 or 1; n is an integer from 1 to 5, preferably 1 to 3, more preferably 1; and B comprises a polymer block of a conjugated diene. The polymer illustrated in U.S. Pat. No. 5,500,469 is an SIS (styrene-isoprene-styrene) block copolymer containing 18% styrene and 82% isoprene and having a weight average molecular weight of about 130,000. Unfortunately, this polymer does not provide the superior comfort known from WO 2013025440. In other words, although this reference identified a broad range of multiblock copolymers as suitable, it did not disclose specific block copolymers with excellent comfort that can be used without vulcanizer and that does not suffer from ballooning when annealed.

In U.S. Pat. No. 5,563,204 an aqueous dispersion is claimed which is capable of forming a free-standing, coherent, elastomeric, solid film which, after drying and annealing at 80° C. for 30 minutes, demonstrates a tensile strength of about 11.0 MPa or greater. It is suggested to use one or more block copolymer(s) corresponding to the formula A-B—$X_m$—(B-A)$_n$, wherein each A polymer block consists essentially of a monovinylidene aromatic monomer, having a weight average molecular weight from about 8,000 to about 15,000 Daltons, each B polymer block consists essentially of a conjugated diene and, optionally, a monovinylidene aromatic monomer having a weight average molecular weight from about 30,000 to about 200,000 Daltons, X is the remnant of a multifunctional coupling agent, m is 0 or 1, and n is an integer from 1 to 5.

In example 1 of this reference a film of an SIS block copolymer is prepared and the tensile strength at break is tested. In example 2 of this reference a radial block copolymer is used. There is no improvement when replacing a linear block copolymer by a radial block copolymer. Ballooning at this temperature does not occur and is not discussed. The latter is not surprising, as the annealing is carried out at a relatively low temperature; a temperature that is too low to provide sufficient strength when using styrenic block copolymers with relatively small endblocks.

It may therefore be concluded that the prior art broadly describes latexes based on linear and branched block copolymers, but that there is no clear teaching how to prepare a vulcanizer-free latex with excellent comfort that can be annealed to provide sufficient strength without suffering from ballooning.

In US 2005020773 Improved adhesives are provided through the use of styrenic radial block copolymers, containing at least 40 wt. % diblock copolymers, the adhesives have improved adhesive properties and a reduced elastic behaviour under die-cutting conditions. No latexes are disclosed.

The inventor set out to find a styrenic block copolymer and a latex comprising water and said styrenic block copolymer that may be used without vulcanizer, and that combines superior comfort, softness and strength without suffering from ballooning.

Moreover, the dip-moulded articles produced therefrom may have to be sterilized by gamma ray irradiation prior to use. Sterilization is particularly important for medical applications (e.g., surgical gloves, tubing, etc.) and food-contact applications. This, however, is not without problems.

The problem to provide a dip-moulded article, particularly gloves for medical use and the like, which have excellent strength and wearing feeling and which is not deteriorated even when the article is sterilized by irradiation with gamma rays is known. This has been discussed in US 2010204397. In this prior art reference styrene/isoprene/styrene block copolymers have been used. According to this reference the use of a phenolic antioxidant added to the dispersion medium is not good enough (cf. Comparative Example 1). Rather, another antioxidant must be added into the rubber, i.e., during the emulsification of the rubber. It would thus appear that dip-moulded articles, like medical gloves and condoms and the like, cannot be made such that they can be sterilized with gamma ray irradiation unless one uses an antioxidant that is present in the rubber constituting the rubber latex, together with a different antioxidant having a melting point of 40° C. or higher that is present in the dispersion medium constituting the rubber latex. This is not ideal.

The current inventors therefore set out to find a latex, capable of being used without vulcanization additives that can be used to make a dip-moulded article that can be annealed without ballooning and that can be sterilized with gamma ray irradiation without loss of properties. This problem too has now been solved.

SUMMARY OF THE INVENTION

Accordingly the invention provides a new olefinically unsaturated radial styrenic block copolymer as defined in claim 1 and an improved vulcanizer-free latex comprising said block copolymer(s) as defined in claim 10. Moreover, it provides a process for preparing dipped goods that includes an annealing step. Finally, it provides dipped goods as defined in claim 18, that exhibit superior comfort, softness and strength, without use of vulcanizers and/or accelerators and without suffering from ballooning. In a further embodiment, the invention provides a particular antioxidant or antioxidant package suitable for use when preparing dipped goods, whereby a thin article with improved tensile strength in combination with enhanced comfort can be obtained that may be sterilised by irradiation with gamma rays. The invention also relates to the sterilisable dip-moulded articles made from the new olefinically unsaturated radial styrenic block copolymer.

BRIEF DESCRIPTION OF THE DRAWINGS

The photo in FIG. 1 illustrates surgical gloves made from latexes that are annealed at a temperature of 120° C. The middle glove is made from the linear block copolymer of WO 2013025440. The glove provides the expected comfort. However, it suffers from excessive ballooning. The surgical gloves in FIG. 2 are made in accordance with the present invention. No ballooning occurs.

DESCRIPTION OF THE EMBODIMENTS

Figure 1:
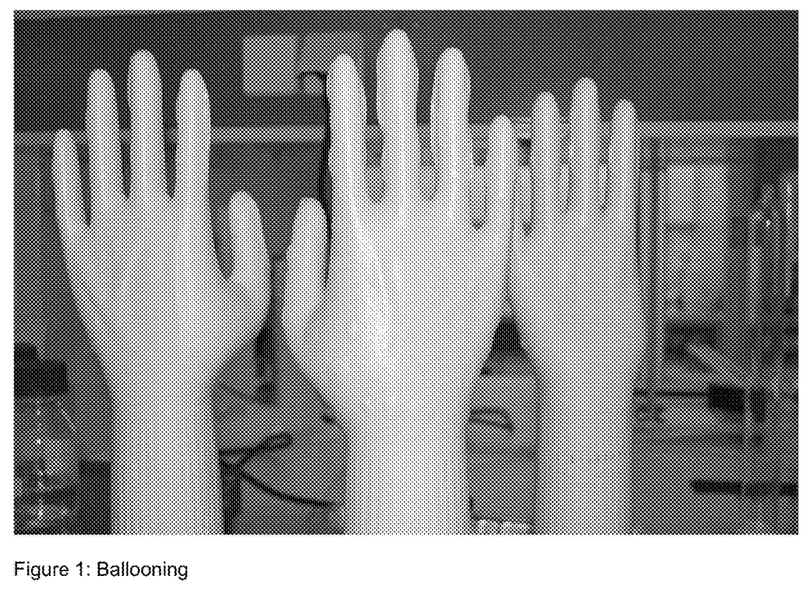
Figure 2:
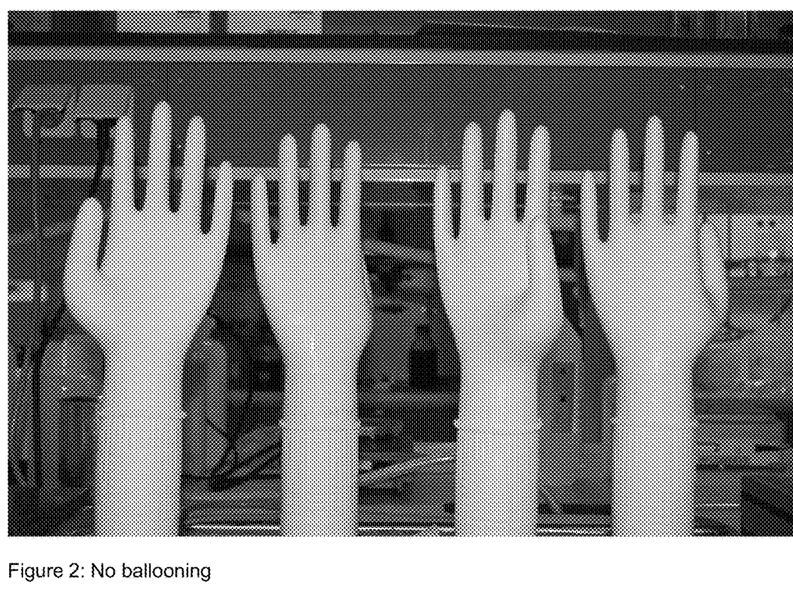

The synthesis of styrenic block copolymers is known since the early 60's of the last century. An early example is U.S. Pat. No. 3,149,182.

The first step of the synthesis involves contacting styrene or a similar alkenyl aromatic hydrocarbon and an initiator, typically an organomonolithium compound in the presence of an inert diluent thereby forming a living polymer compound having the simplified structure A-Li. A is therefore composed for at least 90 mol. % of an alkenyl aromatic hydrocarbon. The alkenyl aromatic hydrocarbon is preferably styrene. Other useful alkenyl aromatic hydrocarbons from which the A blocks may be formed include alphamethyl styrene, tertbutyl styrene, vinyl piperidine and other ring alkylated styrenes as well as mixtures of the same. Minor amounts of other anionically copolymerizable monomers may be included.

The inert diluent may be an aromatic or naphthenic hydrocarbon, e.g., benzene or cyclohexane, which may be modified by the presence of an alkene or alkane such as pentenes or pentanes. Specific examples of suitable diluents include n-pentane, n-hexane, isooctane, cyclohexane, toluene, benzene, xylene and the like.

The initiators that are reacted with the alkenyl aromatic hydrocarbon in step one of the synthesis are represented by the formula RLi; wherein R is an aliphatic, cycloaliphatic, or aromatic radical, or combinations thereof, preferably containing from 2 to 20 carbon atoms per molecule. Exemplary of these organomonolithium compounds are ethyllithium, n-propyllithium, isopropyllithium, n-butyllithium, sec-butyllithium, tert-octyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-hepthylcyclohexyllithium, 4-cyclopentylbutyllithium, and the like. The alkyllithium compounds are preferred for employment according to this invention, especially those wherein the alkyl group contains from 3 to 10 carbon atoms. A much preferred initiator is sec-butyllithium. See, U.S. Pat. No. 3,231,635. The concentration of the initiator can be regulated to control molecular weight. Generally, the initiator concentration is in the range of about 0.25 to 50 millimoles per 100 grams of monomer although both higher and lower initiator levels can be used if desired. The required initiator level frequently depends upon the solubility of the initiator in the hydrocarbon diluent. These polymerization reactions are usually carried out at a temperature in the range of −50 to +150° C. and at pressures which are sufficient to maintain the reaction mixture in the liquid phase.

Next, the living polymer in solution is contacted with a single conjugated diene or mixture of conjugated dienes, forming a polymer block B. B is therefore composed for at least 90 mol. % of one or more conjugated dienes. Other copolymerizable monomers may be included. Preferred dienes include butadiene and isoprene. A much preferred diene is isoprene. Thus, preferably each polymer block B is composed for at least 90 mol. % of isoprene. In a further preferred embodiment, the living polymer is first contacted with isoprene and last contacted with butadiene, whereby at least one butadiene unit is at the end of the living polymer.

The resulting living polymer has a simplified structure A-B—Li. It is at this point that the living polymer may be coupled. The radial styrenic block copolymer of the present invention has a relatively high degree of branching (DoB), being greater than 3. There are a wide variety of polyfunctional coupling agents with a functionality of 3 and greater that can be employed. Examples of the types of compounds which can be used include the polyepoxides, polyisocyanates, polyimines, polyaldehydes, polyketones, polyanhydrides, polyesters, polyhalides, and the like. These compounds can contain two or more types of functional groups such as the combination of epoxy and aldehyde groups, isocyanate and halide groups, and the like. Many suitable types of these polyfunctional compounds have been described in U.S. Pat. No. 3,595,941, U.S. Pat. No. 3,468,972, U.S. Pat. No. 3,135,716, U.S. Pat. No. 3,078,254 and U.S. Pat. No. 3,594,452. A preferred coupling agent is gamma-glycidoxypropyltrimethoxysilane (GPTS).

Coupling efficiency (CE) is defined as the number of molecules of coupled polymer divided by the number of molecules of coupled polymer plus the number of molecules of uncoupled polymer. Coupling efficiency can be determined theoretically from the stoichiometric quantity of coupling agent required for complete coupling, or coupling efficiency can be determined by an analytical method such as gel permeation chromatography. In the present invention coupling efficiency is greater than 90%, preferably from 92% to almost 100%.

The typical coupling conditions include a temperature of between about 60 and about 80° C., and sufficient pressure to maintain the reactants in a liquid phase.

Following the coupling reaction the product may be neutralized such as by the addition of terminators, e.g. water, alcohol or other reagents, for the purpose of removing the lithium radical forming the nucleus for the condensed polymer product.

The block copolymers produced by the process of this invention will have a simple structure wherein
each A is independently a polymer block composed for at least 90 mol. % of an alkenyl aromatic hydrocarbon;
the content of A by weight of the total weight of the polymer (PSC) is in the range of 8-13%;
Y is the remnant of a coupling agent having a functionality greater than 2;
the degree of branching (DoB) is n+1, wherein n is an integer from 2 to 5, preferably 2 to 4;
each B is independently a polymer block composed for at least 90 mol. % of one or more conjugated dienes;
the styrenic block copolymer has a coupling efficiency (CE) of at least 90%;
each A block independently has a weight average molecular weight (MW A) ranging from 9,000 to 15,000, and
each B Block independently has a weight average molecular weight (MW B) ranging from 75,000 to 150,000.

The radial styrenic block copolymer may comprise a small amount of uncoupled block copolymer. The uncoupled polymer has the AB structure. As indicated, the A block is a block mainly composed of polymerized alkenyl aromatic hydrocarbon and the B block is a block is mainly composed of polymerized conjugated diene or dienes. For the purposes of the present invention, the expression mainly indicates that no more than 10 mole %, preferably less than 5 mole % of copolymerizable monomers may be present. As indicated, the A block is a block mainly composed of polymerized alkenyl aromatic hydrocarbon and the B block is a block is mainly composed of polymerized conjugated diene or dienes. For the purposes of the present invention, the expression mainly indicates that no more than 10 mole %, preferably less than 5 mole % of copolymerizable monomers may be present.

The average molecular weight of each of the blocks is important. Polymers having relatively large blocks A will give gloves that are strong, even without vulcanization, but relatively inflexible. The comfort of such gloves will be inferior to that of NR gloves. Polymers having relatively small blocks will be inferior in terms of strength and protection. This is particularly important in the absence of vulcanizers.

The blocks A preferably have average molecular weights between about 10,000 and about 12,000. The blocks B preferably have average molecular weights between about 80,000 and about 120,000. The average molecular weights of the alkenyl aromatic hydrocarbon polymer end blocks are determined by gel permeation chromotography, whereas the alkenyl aromatic hydrocarbon polymer content of the block copolymer is measured by infrared spectroscopy of the finished block polymer. The weight percentage of the A blocks in the finished block polymer should be between 8 and 13%, preferably 10% and 12% by weight.

As indicated above, the present invention also provides a latex comprising water and the new radial styrenic block copolymer(s). The latex should contain little or no vulcanizers and/or accelerators. However, it may comprise various other additives such as oils, co-solvents, waxes, colorants, tackifiers, fillers, release agents, anti-blocking agents and other conventional additives.

For the preparation of the synthetic latex anionic, cationic or non-ionic surfactants or combinations thereof may be used. The surfactant is present in a sufficient amount to emulsify the styrenic block copolymer (or copolymers if a combination of block copolymers is used). To produce a synthetic latex, the styrenic block copolymer, usually in the form of a solution in an organic solvent (also referred to as a cement), is dispersed in water using a suitable surfactant or a combination of surfactants and the organic solvent is removed. A suitable procedure is disclosed in, e.g., U.S. Pat. No. 3,238,173.

For the preparation of thin walled rubber articles preferably a synthetic latex is used having a solids content of from 20 to 80%, more preferably of from 25 to 70% by weight. Most preferably the synthetic latex has a solids content of from 30 to 65% by weight.

The present invention also specifically provides for dipped goods that have been obtained by the process described above. Such goods are thin walled rubber articles such as gloves, catheters or condoms.

To prepare a thin walled rubber article from the latex, such as a film, a suitable surface is coated with the latex and the water thereafter removed by evaporation. A second or further layer may be provided in the same manner to achieve thicker films. The film resulting from the foregoing procedure is dried by any suitable technique. Heating is typically used, with preferred temperatures for drying and subsequent annealing varying from 25 to 130° C. In the current invention, the annealing temperature is preferably within the range of 100-130° C., more preferably about 120° C.

To prepare a dipped article, a similar process is used, wherein a mould is dipped into the latex, in a preferred embodiment of the process for making a thin walled article, the mould is dipped into the latex. The dip-coated mould is then removed from the latex and dried. The mould may be dip coated more than once in the same latex. In an alternative process a mould is dip-coated in a first latex, followed by (air) drying and dip-coating in a second latex and so forth. In this way, balloons and condoms may be made. In a different embodiment, the mould may be dipped in a dispersion of a coagulant, the coagulant on the surface of the mould may be dried, and subsequently, the mould is dipped into the rubber latex. The latter manner is especially used for the manufacture of gloves.

Antioxidants for polymer stabilisation are known. They are commonly used to inhibit polymer oxidation that occurs via chain terminating reactions. The degradation of polymers can occur during various stages of the polymer lifecycle from initial manufacture, through to fabrication and then subsequent exposure to the environment. Oxygen is the major cause of polymer degradation and its effect can be accelerated by other factors such as sunlight, heat, mechanical stress and metal ion contaminates. Polymer degradation during thermal processing and weathering occurs through an autoxidative free radical chain reaction process. This involves the generation of free radicals, then propagation reactions leading to the formation of hydroperoxides and finally termination reactions where radicals are consumed. Hydroperoxides are inherently unstable to heat, light and metal ions, readily decomposing to yield further radicals so continuing the chain reaction.

Primary antioxidants interrupt the primary oxidation cycle by removing the propagating radicals. Such compounds are also called chain-breaking antioxidants and examples include the hindered phenols and aromatic amines. Aromatic amines tend to discolour the end product and hence their use in plastics is limited. The phenolic antioxidants, however, are widely used in polymers. Careful selection of the phenolic antioxidant is required as the oxidation products of some phenols may discolour the polymer. The formation of chromophores is directly related to the structure of the phenol and discolouration can therefore be minimized by choosing a phenolic with a specific structure together with the use of suitable co-stabilizers.

Phenolic stabilizers are primary antioxidants that act as hydrogen donors. They react with peroxy radicals to form hydroperoxides and prevent the abstraction of hydrogen from the polymer backbone. Often used in combination with secondary antioxidants, phenolic stabilizers are offered in an extensive range of molecular weights, product forms, and functionalities. Sterically hindered phenols are the most widely used stabilizers of this type. They are effective during both processing and long term thermal aging and many have FDA approvals.

Examples of suitable phenolic antioxidants include phenolic antioxidants such as 2,6-di-t-butyl-4-methylphenol, 2,6,-di-t-butylphenol, 2,6-di-t-butyl-4-methylphenol, butyl hydroxyanisole, 2,6-di-t-butyl-α-dimethylamino-p-cresol, octadecyl-3-(3,5-di-t-butyl-4-hydroxyphenyl)propionate, styrenated phenol, 2,2'-methylenebis(6-α-methylbenzyl-p-cresol), 4,4'-methylenebis(2,6-di-t-butylphenol), 2,2'-methylenebis(4-methyl-6-t-butylphenol), pentaerythritol tetrakis (3-(3,5-di-tert-butyl-4-hydroxyphenyl)propionate), 3,3',3',5, 5',5'-hexa-tert-butyl-a,a',a'-(mesitylene-2,4,6-triyl)tri-p-cresol, alkylated bisphenol, the butylation reaction product of p-cresol and dicyclopentadiene, and the like. These antioxidants may be used alone or as a mixture of two or more thereof.

Of the above compounds, the reaction product of 4-methylphenol with dicyclopentadiene and isobutylene, with the formula and sold as Wingstay™ L, is the preferred primary antioxidant as it is commercially available in the form of an aqueous dispersion.

The amount of the primary antioxidant is preferably within a range of from 0.1 to 3.0 parts by weight, more preferably within a range of from 0.15 to 2.5 parts by weight, and particularly preferably within a range of from 0.2 to 2.0 parts by weight, per 100 parts by weight of the rubber constituting the rubber latex (phr).

Where the amount of the first antioxidant used is too small, the first antioxidant is easily consumed when the dip-moulded article obtained from the rubber latex is irradiated with irradiation or ultraviolet rays, and this gives rise to the problem of lowering in strength of the dip-moulded article. On the other hand, too large an amount is economically disadvantageous, and additionally could induce the problems that strength of the dip-moulded article is lowered, and the first antioxidant is eluted from the dip-moulded article, contaminating the environment.

Secondary antioxidants are also called preventative antioxidants as they interrupt the oxidative cycle by preventing or inhibiting the formation of free radicals. The most important preventive mechanism is the hydroperoxide decomposition where the hydroperoxides are transformed into non-radical, nonreactive and thermally stable products. Phosphites or phosphonites, organic sulphur containing compounds and dithiophosphonates are widely used to achieve this, acting as peroxide decomposers.

For the purpose of the present invention, sterilisable dip-moulded articles, thioesters are the preferred secondary antioxidants. Thioesters are organic molecules containing sulphur which have a cooperating (synergistic or additive) effect when added with a primary antioxidant. Thioesters are usually used in products with end-use requirements that include long-term exposure to high temperatures, such as under-the-hood automotive applications and home appliances.

Examples of suitable thioesters include: dilauryl thiodipropionate and distearyl thiodipropionate.

Of the above compounds, dilauryl thiodipropionate, sold as Irganox™ PS 800, is the preferred thioester.

The amount of the thioester is preferably within a range of from 0.1 to 3.0 parts by weight, more preferably within a range of from 0.15 to 2.5 parts by weight, and particularly preferably within a range of from 0.2 to 2.0 parts by weight, per 100 parts by weight of the rubber constituting the rubber latex.

Instead of or in addition to the use of a phenolic primary antioxidant and a thioester also a thio-functionalized phenolic antioxidant may be used. Examples include; thiobisphenolic antioxidants such as 2,2'-thiobis(4-methyl-6-t-butylphenol), 4,4'-thiobis(6-t-butyl-o-cresol), 4,6-bis (octylthiomethyl)-o-cresol, 4,6-bis(dodecylthiomethyl)-o-cresol, thiodiethylene bis[3-(3,5-di-tert.-butyl-4-hydroxyphenyl)propionate], 2,6-di-t-butyl-4-(4,6-bis(octylthio)-1,3, 5-triazin-2-ylamino)phenol, and the like. These antioxidants may be used alone or as a mixture of two or more thereof.

Of the above compounds, 2,6-di-t-butyl-4-(4,6-bis(octyl-thio)-1,3,5-triazin-2-ylamino)phenol, sold as Irganox 565, is the preferred thio-functionalized phenolic antioxidant. Of similar interest are Irganox 1035 (thiodiethylene bis[3-(3,5-di-tert.-butyl-4-hydroxy-phenyl)propionate]) and Irganox 1726 (4,6-bis(dodecylthiomethyl)-o-cresol).

The amount of the thio-functionalized phenolic antioxidant is preferably within a range of from 0.1 to 3.0 parts by weight, more preferably within a range of from 0.15 to 2.5 parts by weight, and particularly preferably within a range of from 0.2 to 2.0 parts by weight, per 100 parts by weight of the rubber constituting the rubber latex.

In addition to the antioxidants that have been described above, the latex may comprise various other additives such as oils, co-solvents, waxes, colorants, tackifiers, fillers, release agents, anti-blocking agents and other conventional additives. On the other hand, the latex preferably contains no vulcanization additives.

The present invention also provides a latex comprising water, a branched styrenic block copolymer of general formula A-B—Y—(B-A)$_n$, wherein Y is the remnant of a multifunctional coupling agent, n is an integer from 2 to 5, A is a poly(vinyl aromatic) block with a weight average molecular weight ranging from 9,000 to 15,000, diene block B independently has an apparent weight average molecular weight ranging from 75,000 to 150,000 and the content of poly(vinylaromatic) blocks in the branched styrenic block copolymer ranges from 8 to 15% wt., based on the total styrenic block copolymer, and a thio-functionalized phenolic antioxidant or an antioxidant package consisting of a combination of a primary phenolic antioxidant and a thioester secondary antioxidant, present in the dispersion medium.

The present invention also specifically provides for the sterilisable dip-moulded article that has been obtained by the process for preparing an article from the latex as described above, and to the use of any such article as glove, catheter or condom.

Additional features and advantages of the present invention are described in the following examples.

EXAMPLE

Test Methods:

Molecular weights were determined by GPC (Gel Permeation Chromatography) using a calibration curve based on mono-dispersed polystyrene standards such as is done according to ASTM 3536. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector.

Tests for physical properties were performed using ASTM D412 (92), die C. All tests were performed on an Instron 4465 tensile machine. Since the Young's modulus (at 0% elongation) of the very soft and flexible materials that were obtained in the experiments appeared very difficult to measure, the modulus of the synthetic latexes at low elongation (between 5 and 15 mm) was measured and the result was called "10% Young's modulus".

Complex modulus was determined by performing Dynamic Mechanical measurement according to ISO 6721-1 1994. All tests were performed on a Rheometrics Spectrometer series II.

Example 1

Polymerization of polymer according to the invention was performed in a 40 liter stirred stainless steel reactor. 19.5 kg dry cyclohexane was transferred into the reactor and heated to 50° C. 76 ml of a 0.44M s-butyllithium solution was added. 300 g of styrene was added to the reactor and after 1 hour 2400 g of isoprene was slowly added (100 g/min) and the temperature was maintained at 60° C. 45 minutes after the isoprene addition the temperature was increased to 70° C. and 2.4 ml of gamma-glycidoxypropyltrimethoxysilane was added. After 30 minutes 2 ml methanol was added to terminate the reaction.

Results:
Block A MW: 12,000;
Block B MW: 92,000;
PSC: 11%;
DoB: 3.0, and
CE: 94%

Example 2

A series of latexes were formed from various linear and radial poly(styrene-b-isoprene-b-styrene) block copolymers A to J. The block copolymers are described in the Tables 1 and 2 below. "MW A" in Table 1 refers to the polystyrene block that is formed first. This is the weight average molecular weight. MW B refers to the polyisoprene block that is formed thereafter. Typically it is calculated by dividing the molecular weight of the finished block copolymer by the average degree of branching (DoB), and subtracting MW A. (living) poly(styrene-b-isoprene) polymers before coupling. PSC refers to the content by weight of the A blocks. CE refers to the coupling efficiency, where f.s. refers to full sequential: a block copolymer that is made without coupling and with a theoretical CE of 100% (MW B in Table 1 for full sequential polymers is calculated by using a fictive DoB of 2).

TABLE 1

|  | A | B | C | D | E |
|---|---|---|---|---|---|
| MW A | 11,000 | 11,000 | 12,000 | 15,000 | 11,000 |
| MW B | 49,000 | 61,000 | 82,000 | 105,000 | 94,000 |
| PSC (%) | 18.5 | 15 | 12.5 | 12.5 | 11 |
| DoB | Linear | 2.1 | 2.1 | 2.1 | Linear |
| CE (%) | f.s. | 80 | 90 | 90 | f.s. |

TABLE 2

|  | F | G | H | I | J |
|---|---|---|---|---|---|
| MW A | 10,000 | 11,000 | 12,000 | 12,000 | 12,000 |
| MW B | 115,000 | 97,000 | 92,000 | 149,000 | 93,000 |
| PSC (%) | 8 | 11.5 | 11 | 7 | 17.5 |
| DoB | Linear | 3.0 | 3.0 | 3.1 | >4 |
| CE (%) | f.s. | 84 | 94 | 86 | 58 |

The radial block copolymer according to the invention, is polymer H. Polymer A is similar to the polymer of U.S. Pat. No. 5,500,469. Polymer B is the commercial polymer, Kraton® D1161). Polymers C and D were made with methyltrimethoxysilane. Polymer E is similar to the polymer of WO 2013/025440. Polymers G and I were made with GPTS. Polymer J is similar to the polymer of US 2005/020773, made with bistrimethoxysilylethane. Other comparative examples were included to show the effect of branching, coupling efficiency, polystyrene content, and size of the A blocks.

The latexes contained 30% by weight of the block copolymer. No vulcanizers or accelerators were added. Other components included an anionic surfactant and an anti-oxidant. Test specimens were prepared by first dipping stainless steel plates in a coagulant solution and, after drying, in the polymer latex. The objective was to form a uniform layer of the latex as it precipitated onto the plates. The films were annealed in an oven at about 120° C. for 15 minutes.

The films were then tested on tensile strength, softness and ballooning. The results are described in the Tables and 4 below. "TS" refers to tensile strength (MPa). When greater than 20 MPa this is considered good (+). "10% Y" refers to the 10% Young's modulus (MPa). This parameter is a measure for softness. When smaller than 0.25 MPa this is considered good (+). Ballooning is inspected visually. When no deformities and/or loss of dimensional stability are seen this is considered good (+). "C. Mod." refers to complex modulus (Pas) as described in ASTM D4092-07 A complex modulus at 120° C. of 2×105 Pas or higher results in no ballooning and is considered good (+).

TABLE 3

|  | A | B | C | D | E |
|---|---|---|---|---|---|
| TS | 22 (+) | 21 (+) | 22 (+) | 20 (−) | 22 (+) |
| 10% Y | 0.35 | 0.28 | 0.23 | 0.26 | 0.19 |
| Softness | − | − | + | − | + |
| Ballooning | + | − | − | + | − |
| C. Mod. | $2.4 \times 10^5$ | $1.7 \times 10^5$ | $1.8 \times 10^5$ | $1.4 \times 10^5$ | $1.3 \times 10^5$ |

TABLE 4

|  | F | G | H | I | J |
|---|---|---|---|---|---|
| TS | 21 (+) | 19 (−) | 24 (+) | 15 (−) | 13 (−) |
| 10% Y | 0.22 | 0.17 | 0.20 | 0.17 | 0.17 |
| Softness | + | + | + | + | + |
| Ballooning | − | + | + | + | + |
| C. Mod. | $0.7 \times 10^5$ | $5.6 \times 10^5$ | $6.4 \times 10^5$ | $1.0 \times 10^5$ | $2.9 \times 10^5$ |

Further tests were performed with the following anti-oxidants:

| Irganox PS800 | dilauryl thiodipropionate |
| Irgafos ™ 168 | tris(2,4-ditert-butylphenyl)phosphite |
| Wingstay L | butylation reaction product of p-cresol and dicyclopentadiene |
| Irganox 565 | 2,6-di-t-butyl-4-(4,6-bis(octylthio)-1,3,5-trizin-2-ylaminao)phenol |
| Irganox 1035 | thiodiethylene bis[3-(3,5-di-tert-butyl-4-hydroxy-phenyl)propionate] |
| Irganox 1726 | 4,6-bis(dodecylthiomethyl)-o-cresol |

The stability of the various anti-oxidants in the caustic latex environment was tested by stirring a small amount of each compound in a diluted soap solution of pH 11. Irgafos 168 appeared to hydrolyze completely within 48 hours and this compound has not been used. The other anti-oxidants were stable.

The anti-oxidants were dispersed in a 1% sodium dodecylbenzenesulfonate solution using an IKA T-25 high shear mixer. Solids content of the dispersions was 20-25%. Median particle size of the dispersions was between 0.5 and 2 μm. The Wingstay L dispersion was purchased from Aquaspersions Ltd.

Example 3

The branched styrenic block copolymer of Example 1 was converted into a latex by contacting the polymer solution with an aqueous soap solution (rosin type anionic surfactant) using a rotor/stator emulsifier thus forming an oil-in-water emulsion. The hydrocarbon solvent was removed by evaporation. The obtained diluted latex was concentrated by centrifugation. The so produced latex had a rubber content of 64% and the median particle size was 1.7 μm. This latex was diluted with water to 30%. To this latex 0.75 phr Manawet 176 surfactant was added. The antioxidants were added to the latex at different concentrations and in different combinations and the mixtures were stirred for 24 hours. The latexes were then passed over a mesh filter to determine any destabilization. Films were dipped according to standard coagulant dipping procedures and annealed at 120° C. for 20 minutes.

Gamma Ray Irradiation

Gamma ray irradiation was performed using a 60Co source. Customers typically apply a gamma dosage between 25 and 40 kGy. In this test 50 kGy was applied.

Ageing

Ageing was performed in a hot air oven at 70° C. for 7 days according to ASTM D573-99.

Example 4

The composition of the packages that have been tested is listed in Table 5. Tensile strengths measured after gamma ray irradiation sterilization and subsequent accelerated ageing, are collected in Table 6. The ASTM specification for sterile surgical gloves is 17.3 MPa and the specification for aged surgical gloves is 12.2 MPa.

TABLE 5

|  | COMPOUND | | | | | | | |
|---|---|---|---|---|---|---|---|---|
| Anti-oxidant (phr) | A | B | C | D | E | F | G | H |
| Wingstay L | 2.0 | 1.0 | | | | | | |
| Irganox PS800 | | 1.0 | | | | | | |
| Irganox 565 | | | 2.0 | 1.0 | | | | |
| Irganox 1035 | | | | | 2.0 | 1.0 | | |
| Irganox 1726 | | | | | | | 2.0 | 1.0 |

TABLE 6

|  | TENSILE STRENGTH (MPa) | | | | | | | |
|---|---|---|---|---|---|---|---|---|
| Compound | A | B | C | D | E | F | G | H |
| Untreated Film | 24 | 24 | 24 | 24 | 24 | 24 | 24 | 24 |
| Sterilized Film | 22 | 20 | 23 | 21 | 22 | 21 | 22 | 22 |
| Aged Film | 13 | 19 | 22 | 22 | 22 | 20 | 19 | 20 |

The polymer film dipped from Compound A, containing only a phenolic antioxidant, has low tensile strength after accelerated ageing. The film dipped from the compound containing a combination of phenolic antioxidant and thioester (Compound B) still has high tensile strength after accelerated ageing. Films dipped from the compounds C-H, all containing the thio functionalized phenolic antioxidants, have high tensile strength, even at half of the concentration.

Thus, the results obtained with Compounds B-H show that a thio functionalized phenolic antioxidant or a combination of a phenolic primary antioxidant and a thioester secondary antioxidant only present in the dispersing medium is able to stabilize the polymer during and after gamma irradiation sterilization.

CONCLUSIONS

As is clear from the above results, having a balance of strength, softness, comfort, lack of ballooning and without the presence of vulcanizers/accelerators is hard to achieve. Surprisingly, block copolymers within a very narrowly defined range in terms of branching, coupling efficiency, polystyrene content and molecular weight exist that excel in these properties.

The final experiments also illustrate that dip-moulded articles can be made that can be sterilized with gamma ray irradiation without loss of properties.

The invention claimed is:
1. An olefinically unsaturated radial styrenic block copolymer of the general formula:

wherein
  each A is independently a polymer block composed of at least 90 mol. % of an alkenyl aromatic hydrocarbon;
  the content of A by weight of the total weight of the polymer (PSC) is in the range of 9-12%;
  Y is the remnant of a coupling agent having a functionality greater than 2;
  the degree of branching (DoB) is n+1, wherein n is an integer from 2 to 4;
  each B is independently an olefinically unsaturated polymer block composed of at least 90 mol. % of one or more conjugated dienes;
  the styrenic block copolymer has a coupling efficiency (CE) in the range of 84 to 100%;
  each A block independently has a weight average molecular weight (MW A) ranging from 10,000 to 12,000;
  each B Block independently has a weight average molecular weight (MW B) ranging from 80,000 to 120,000, wherein the molecular weights are determined pursuant to ASTM 3536 using mono-dispersed polystyrene standards;
  a film prepared from the olefinically unsaturated radial styrenic block copolymer has tensile strength of greater than or equal to 19 MPa, 10% Young's modulus smaller than 0.25 MPa and complex modulus at 120° C. of $5.6 \times 10^5$ Pas or higher.

2. The radial styrenic block copolymer of claim 1, wherein each B is a polymer block composed of at least 90 mol. % of isoprene.

3. The radial styrenic block copolymer of claim 2, wherein at least one B comprises at most 10 mol. % butadiene with at least 1 butadiene unit directly connected to the remnant of the coupling agent Y.

4. The radial styrenic block copolymer of claim 1, wherein each A is a polymer block composed of at least 90 mol. % of styrene.

5. The radial styrenic block copolymer of claim 1, wherein Y is the remnant of gamma-glycidoxy-propyltrimethoxysilane.

6. A vulcanizer-free artificial latex comprising water and one or more styrenic block copolymers as defined in claim 1 dispersed in said water in an amount of 20 to 80% by weight of the combination of water and styrenic block copolymer and said latex being free from vulcanizer.

7. The artificial latex of claim 6, comprising said one or more styrenic block copolymers in an amount of 50 to 70% by weight of the combination of water and styrenic block copolymer.

8. The artificial latex of claim 6, comprising
  (a) a thio-functionalized phenolic antioxidant, or
  (b) an antioxidant package comprising a primary phenolic antioxidant and a thioester as secondary antioxidant; or
  (c) a combination of (a) and (b).

9. The artificial latex of claim 6 comprising a primary phenolic antioxidant selected from 2,6-di-t-butyl-4-methylphenol, 2,6,-di-t-butylphenol, 2,6-di-t-butyl-4-methylphenol, butyl hydroxyanisole, 2,6-di-t-butyl-α-dimethylamino-p-cresol, octadecyl-3-(3,5-di-t-butyl-4-hydroxyphenyl)propionate, styrenated phenol, 2,2'-methylenebis(6-α-methylbenzyl-p-cresol), 4,4'-methylenebis (2,6-di-t-butylphenol), 2,2'-methylenebis(4-methyl-6-t-butylphenol), pentaerythritol tetrakis(3-(3,5-di-t-butyl-4-hydroxyphenyl)propionate), 3,3',3',5,5',5'-hexa-tert-butyl-a,a',a'-(mesitylene-2,4,6-triyl)6-tril)tri-p-cresol, alkylated bisphenol, the butylation reaction product of p-cresol and dicyclopentadiene, or a mixture of two or more thereof, and comprising a thioester selected from dilauryl thiodipropionate and distearyl thiodipropionate.

10. The artificial latex of claim 6 comprising a thio-functionalized phenolic antioxidant selected from thiobisphenolic antioxidants.

11. The artificial latex of claim 10, wherein said thiobisphenolic antioxidants are selected from 2,2'-thiobis(4-methyl-6-t-butylphenol), 4,4'-thiobis(6-t-butyl-o-cresol), 4,6-bis(octylthiomethyl)-o-cresol, 4,6-bis(dodecylthiomethyl)-o-cresol, thiodiethylenebis[3-(3,5-di-t-butyl-4-hydroxy-phenyl)propionate], or 2,6-di-t-butyl-4-(4,6-bis(octylthio)-1,3,5-triazin-2-ylamino)phenol.

12. The artificial latex of claim 6 comprising a thio-functionalized phenolic antioxidant, and/or a combination of a primary phenolic antioxidant and a thioester wherein the amount of the thio-functionalized phenolic antioxidant is within a range of from 0.1 to 3.0 parts by weight, per 100 parts by weight of the rubber constituting the rubber latex (phr), and/or wherein the amount of the primary antioxidant and the thioester are each independently within a range of from 0.1 to 3.0 parts by weight, per 100 parts by weight of the rubber constituting the rubber latex (phr).

13. A process for preparing articles by coagulation dipping from the artificial latex according to claim 6, wherein a film is made from the latex and said film is allowed to dry and wherein said film is annealed for at least 10 minutes at an annealing temperature within the range of 100-130° C.

14. The process of claim 13, wherein said film is annealed at about 120° C.

15. The method of claim 13 further comprising subjecting the articles to irradiation.

16. Dipped goods comprising a film composed of the olefinically unsaturated radial styrenic block copolymer of claim 1.

17. The radial styrenic block copolymer of claim 1, wherein the coupling efficiency (CE) is in the range of 90 to 100%; and wherein the complex modulus is $6.4 \times 10^5$ Pas or higher.

* * * * *